United States Patent [19]
Sulzberger et al.

[11] Patent Number: 5,629,945
[45] Date of Patent: May 13, 1997

[54] ELECTRONIC ARITHMETIC UNIT WITH MULTIPLE ERROR DETECTION

[75] Inventors: Peter Sulzberger; Eberhard Boehl, both of Reutlingen, Germany

[73] Assignee: Robert Bosch GmbH, Stuttgart, Germany

[21] Appl. No.: 389,707

[22] Filed: Feb. 14, 1995

[30] Foreign Application Priority Data

Feb. 26, 1994 [DE] Germany .................. 44 06 391.1

[51] Int. Cl.$^6$ .......................... G01R 31/28; G06F 11/00
[52] U.S. Cl. ...................... 371/22.5; 371/48; 371/68.1
[58] Field of Search ........................ 371/30, 48, 49.2, 371/68.1, 67.1, 49.1, 22.5, 22.6, 68.3, 71, 22.1; 364/736, 737–741

[56] References Cited

U.S. PATENT DOCUMENTS

| | | | |
|---|---|---|---|
| 4,994,993 | 2/1991 | Asghar et al. | 364/740 |
| 5,043,990 | 8/1991 | Doi et al. | 371/68.1 |
| 5,301,199 | 4/1994 | Ikenaga et al. | 371/22.5 |
| 5,450,340 | 9/1995 | Nicolaidis | 371/49.4 |

OTHER PUBLICATIONS

Hayashi et al., A 64b CMOS Mainframe Execution Unit Macrocell with Error Detecting Circuit, Nov. 1991, IECE Transactions, vol. E74, No. 11, pp. 3775–3779.

Fault–Detecting Adder, IBM Technical Disclosure Bulletin, vol. 29, No. 8, Jan. 1987.

R. J. Maier, Low Power Error Correction Architecture for Space, Dec. 1983, IEEE Tranactons on Nuclear Science, vol. NS-30, No. 6, pp. 4333–4338.

Nicolaidis, "Efficient Implementations of Self–Checking Addersard ALUs," 23rd IEEE International Symposium on Fault Tolerant Computing Jun. 1993, pp. 586–595.

I.G. Maloff, "Checking Codes for Digital Computers," Proceedings of the IRE, Apr. 1955, pp. 487–488.

D.T. Brown, "Error Detecting and Correcting Binary Codes for Arithmetic Operands," IRE Transactions Electronic Computers, Sep. 1960, pp. 333–337.

W.W. Peterson, "On Checking and Adder," IBM Journal, Apr. 1958, pp. 166–168.

J.C. Lo et al., "An SFS Berger Check Prediction ALU and its Application to Self–Checking Processor Designs," IEEE Transactions on Computer–Aided Design, vol. II, No. 4, Apr. 1992, pp. 525–540.

H.P. Holzpfel, "Fault–Tolerant VLS Processor," 3rd International GI/ITG/GMA Conference, Sep. 1987, pp. 72–82.

(List continued on next page.)

Primary Examiner—Paul P. Gordon
Assistant Examiner—Thomas E. Brown
Attorney, Agent, or Firm—Kenyon & Kenyon

[57] ABSTRACT

An electronic arithmetic unit, such as an ALU, a processor, a controller, or the like, is for the arithmetic gating (combining) of digital operands coded by code bits and supplied via at least one data bus to form data words likewise coded by code bits. The arithmetic gating of the bits of the operands takes place in stages, and in each stage, at least one carry bit is generated. A code-generating unit generates the code bits of the result word from the coded operands while taking into consideration the required operation of the code bits. An additional circuit for duplicated carry generation is assigned to the individual stages. In addition, a testing device is provided for checking the duplicated carry bits for identity. Finally, for each operand, a code checker is provided, which is linked to the individual lines of the at least one data bus via connecting lines, the arithmetic unit and the circuit for duplicated carry generation being connected up between the code checker and the data bus to the connecting lines. In this manner, in addition to faulty operand bits and carry bits, interrupt errors on operand-bit lines can also be detected.

11 Claims, 4 Drawing Sheets

OTHER PUBLICATIONS

B. Khodadad–Mostashiry, "Parity Prediction In Combinational Circuits," Proceedings of the FTCS–9, IEEE Computer Society, 1979, pp. 185–188.

E. Fujiawara et al., "Fault–Tolerant Arithmetic Logic Unit Using Parity–Based Codes," The Transactions of IEEE of Japan, vol. E64, No. 10, Oct. 1981, pp. 653–660.

J. Wakerly, "Error Detecting Codes, Self–Checking Circuits and Applications," The Computer Science Library, 1978, pp. 66–67.

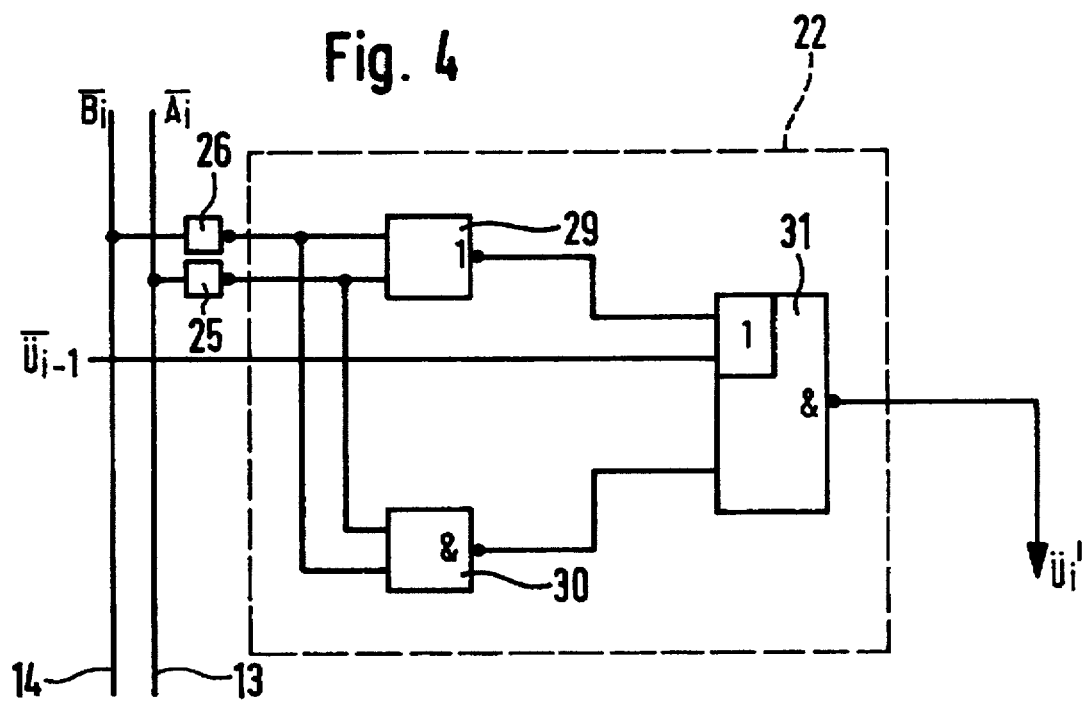

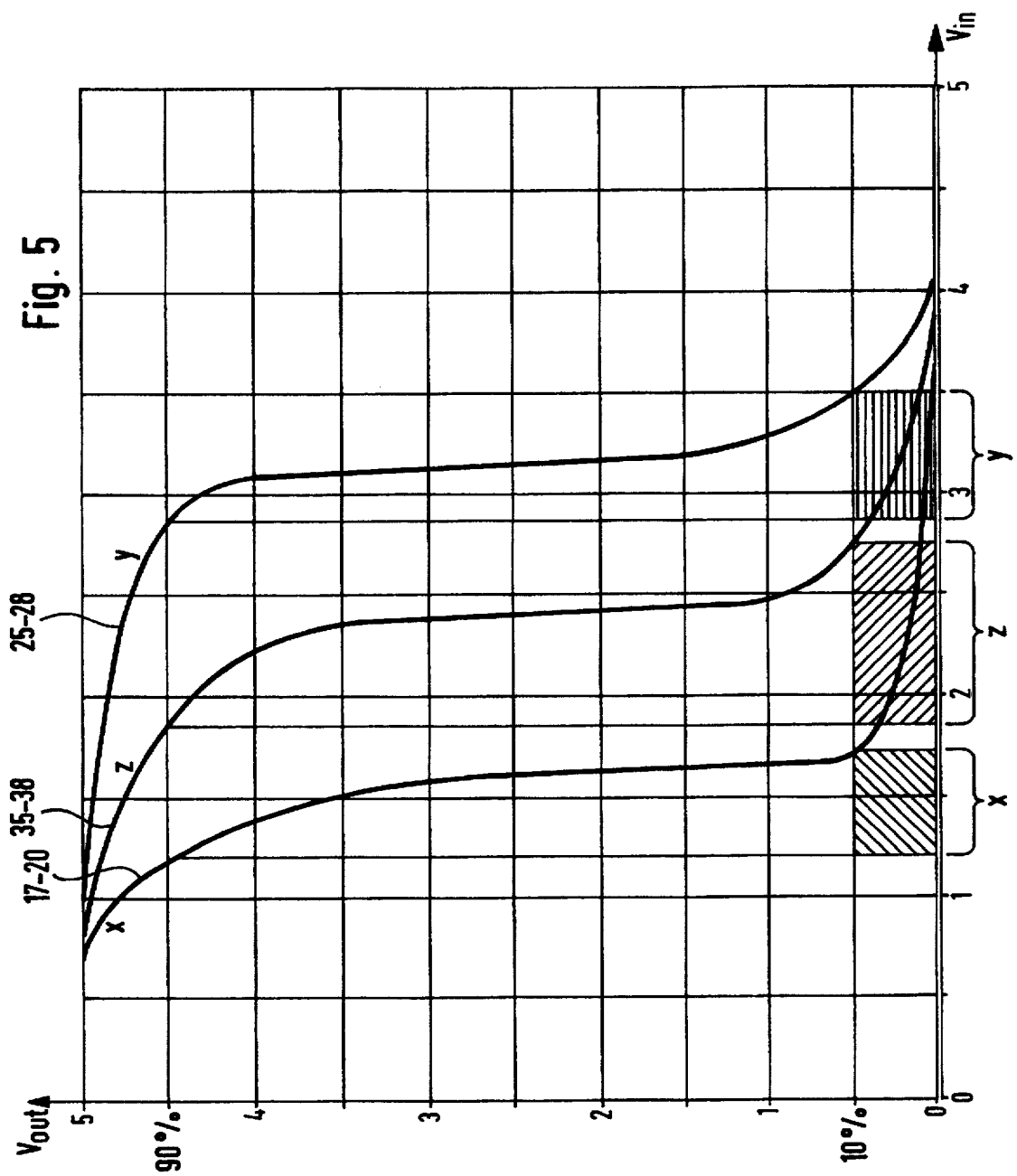

ELECTRONIC ARITHMETIC UNIT WITH MULTIPLE ERROR DETECTION

FIELD OF THE INVENTION

The present invention relates to an electronic arithmetic unit, such as an ALU-processor, controller, or the like, for the arithmetic gating (combining) of digital operands coded by code bits and supplied via at least one data bus to form data words likewise coded by code bits.

BACKGROUND INFORMATION

In arithmetic units or arithmetic-logic units, errors produced by a plurality of causes can occur during routine operation and, when not discovered, can lead to a safety risk, especially when the arithmetic unit is employed in applications that are critical to safety.

A publication by Nicolaidis, "Efficient Implementations of Self-Checking Adders and ALUs", 23rd IEEE International Symposium on Fault Tolerant Computing, Toulouse, France, June 1993, describes where an additional carry look-ahead adder circuit is assigned to an ALU, the duplicated carry bits being checked for identity. By this means, incorrectly generated carry bits and corresponding faulty results from arithmetic logic operations can purportedly be detected. It furthermore provides arithmetic codes for operands, arithmetically combined results for ALUs, and for the checking of these. Reference is made to the following exemplary publications:

[1] Maloff, I. G., Camden, N. J.: Checking Codes for Digital Computers, Proceedings of the IRE, April 1955, pp. 487–488;

[2] Peterson, W. W.: On Checking and Adder, IBM Journal, April 1958, pp. 166–168;

[3] Brown, D. T.: Error Detecting and Correcting Binary Codes for Arithmetic Operations, IRE Transactions on Electronic Computers, September 1960, pp. 333–337;

[4] Lo, J. Ch., Thanawastien, S., Rao, T. R. N., Nicolaidis, M.: An SFS Berger Check Prediction ALU and its Application to Self-Checking Processor Designs, IEEE Transactions on Computer-Aided Design, Vol. 11, No. 4, April 1992, pp. 525–540;

[5] Holzapfel, H. P.: Fehlertolerante VLSI-Prozessoren [Fault-tolerant VLSI Processors], Diss. TU Munich, 1987;

[6] Khodadad-Mostashiry, B.: Parity Prediction in Combinational Circuits, Proceedings of the FTCS-9, IEEE Computer Society, 1979;

[7] Fujiwara, E., Haruta, K.: Fault-Tolerant Arithmetic Logic Unit Using Parity-Based Codes, The Transactions of the IECE of Japan, Vol. E 64, No. 10, October 1981, pp. 653–660.

A solution entailing parity-bit prediction is introduced in [6] and is expanded upon in [7] to include using error-correcting codes. Common to all the known testing or monitoring devices is that in each case only single, specially occurring faults are able to be detected. Other, faults, however, are not detectable.

SUMMARY OF THE INVENTION

The arithmetic unit according to the present invention has the advantage of allowing a plurality of possible types of faults to be detected. Thus, not only faulty carry bits, but also faulty bits of the operands and of the generated results are able to be detected. Furthermore, defective lines, especially lines leading to the arithmetic unit, and faulty signal levels can also be detected by the configuration of the arithmetic unit, the circuit for duplicated carry generation, and the code-testing circuit (code checker) in relation to one another, through suited transfer characteristics.

The spaced-apart arrangement of the individual stages of the arithmetic unit with respect to the corresponding stages of the circuit for duplicated carry generation on the connecting lines enable interrupt faults on an operand-bit line to be detected quite reliably, particularly when each stage of the circuit for duplicated carry generation is connected via one single terminal connection to the assigned connecting lines (operand-bit lines), which each have one bit of the two operands.

The outputs of the code checker for checking the output signals are linked to the testing device, so that besides testing the carry bits, this testing device can also simultaneously test the output signals from the code checker.

The testing device is expediently made up of SCC (self-checking checker) stages, different output signals indicating the fault-free method of operation only being able to be generated given different signals (0- or 1-signals) on each of at least two input pairs. These types of SCC stages are described in and of themselves in The Computer Science Library "Error Detecting Codes, Self-Checking Circuits and Applications", John Wakerly, BNR INC., Palo Alto, Calif. and Stanford University. Depending on the number of signal pairs to be checked, such SCC stages can be interlinked in a tree-type structure.

A still more reliable detection of faulty and indefinite signal levels, for example which may occur as the result of interrupt and short-circuit errors, can be achieved by connecting one level converter in each of the lines (operand-bit lines) which exhibit one bit of the operands leading to the individual stages of the arithmetic unit, and of the circuit for duplicated carry generation, as well as to the code checker, the level converters of the arithmetic unit the circuit for duplicated carry generation, and the code checker, each having gradationally different response characteristics. The three input-threshold voltage ranges of the three groups of level converters are preferably not conceived as overlapping ranges. The input-threshold voltage range of the level converters of the code checker lies between the input-threshold voltage ranges of the level converters of the two other groups. input-threshold voltage range is defined as that voltage range below which a level converter reliably detects a 0-signal and above which it reliably detects a 1-signal. This ensures that when the same level of the level converters of the aritmetic unit and of the circuit for duplicated carry generation is detected, the level converters of the code checker also detect the same level. If this level came about erroneously, the code checker determines this fault. If, on the other hand, the level converters of the arithmetic unit and of the circuit for duplicated carry generation detect different levels, the fault is detected by comparing the carry bits in the testing device. The level converters may be designed as inverters.

BRIEF DESCRIPTION OF THE DRAWINGS

FIG. 4 shows a circuit for duplicated carry generation.

FIG. 5 shows a signal diagram for clarifying the various input-threshold voltage ranges of the inverters connected in incoming circuit to the individual stages.

DETAILED DESCRIPTION OF THE INVENTION

Figure 1:
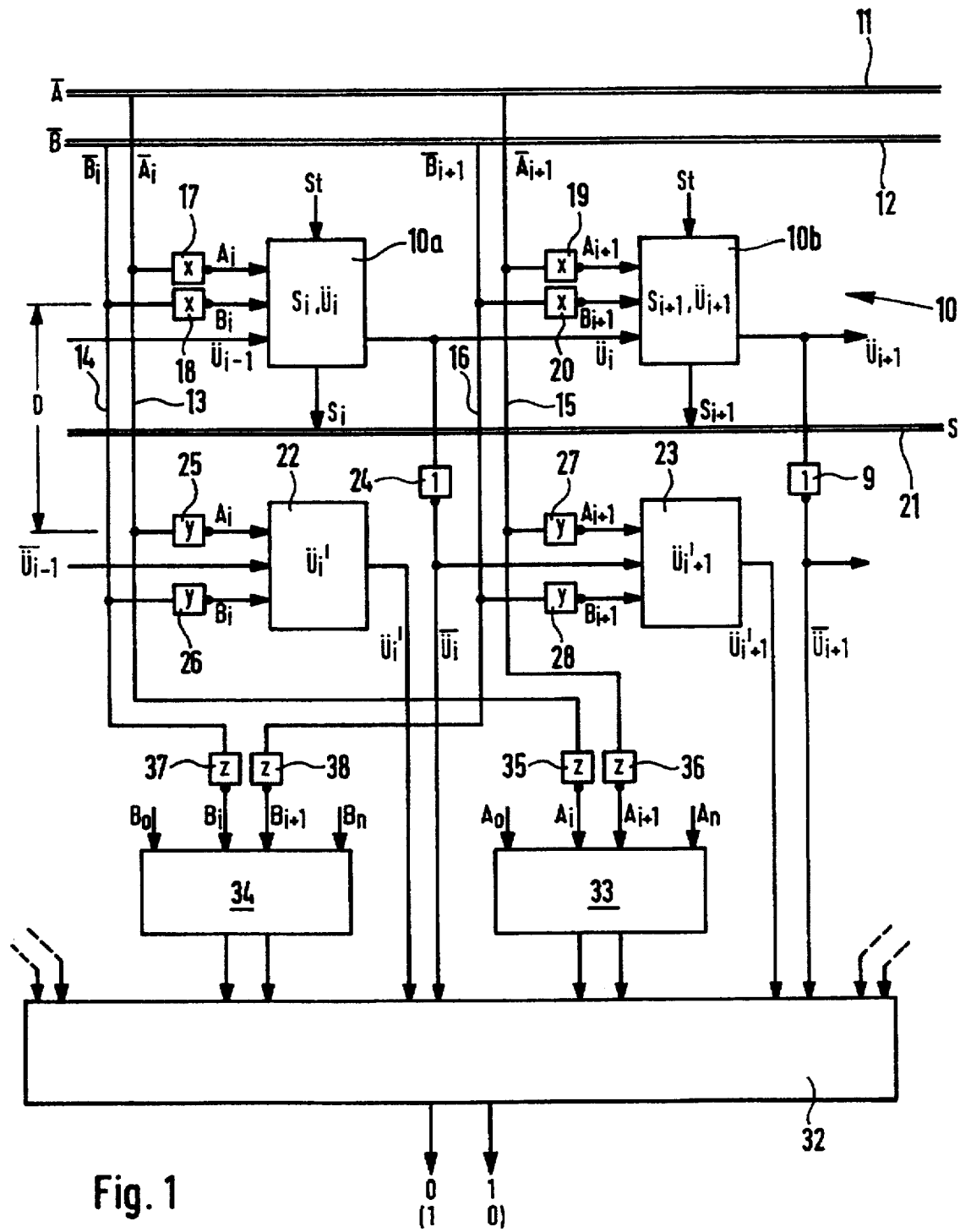
FIG. 1 shows a block diagram of two stages (for 2 bits) of an ALU with a testing and monitoring device in accordance with the present invention.

In the case of the exemplary embodiment depicted in FIG. 1, an ALU 10 (arithmetic-logic unit) includes various single elements for processing or combining (gating) the individual bits of two operands $\overline{A}$ and $\overline{B}$. For the sake of simplicity, only two such single elements 10a and 10b for processing the i-th bit and the (i+1)-th bit of these two operands are shown in FIG. 1. These single elements 10a, 10b can also be single elements of another electronic arithmetic unit, such as of a processor, a controller, or the like.

The operands $\overline{A}$ and $\overline{B}$ are applied to two data buses 11, 12, the i-th bits being supplied via connecting lines 13, 14, and the (i+1)-th bits via connecting lines 15, 16, as well as via inverters 17–20, as level converters to the single elements 10a, 10b. The inverters 17–20 have switching characteristics x pursuant to the voltage diagram shown in FIG. 5.

The information bits of the operands $\overline{A}$ and $\overline{B}$ are processed, for example, added, subtracted, multiplied, or in another known way combined in a logic operation in the ALU 10, in accordance with the applied control signals St. In so doing, a carry bit $\ddot{U}_i$, or $\ddot{U}_{i+1}$ for the next single element in each case, as well as a combinational bit, for example a sum bit $S_i$ or $S_{i+1}$, is generated from each single element 10a, 10b, and is fed in each case to a result data bus 21. The operands $\overline{A}$ and $\overline{B}$, as well as the result data word S supplied in each case to the data bus 21 are coded, for example by means of a customary even or odd parity bit. Since this code is not an arithmetic code, special measures must be provided, particularly for the case of the addition, so that the result data word is coded accordingly. In turn (code-generating unit not shown here), however, additional logic operations are necessary even in the case of non-linear logic operations (such as AND or OR operations). On the other hand, in the case of linear, logic operations (EXOR or equivalence operations, shift operations and negations) only very simple logic operations are needed to produce the parity bit for the result. More complex operations (such as NAND-, NOR-, SUB-, DEC-, INC-, MUL- and DIV operations) are to be attributed to the preceding basic operations.

For the subtraction operations, in particular, the complement of the subtrahend is to be formed and thus added to the incoming carry to the minuend. The processing speed of the code-generating unit (not shown in greater detail) required for these operations is to be selected through appropriate dimensioning and structuring so as to ensure that no loss of speed results from the code generation. This is easily possible when the transfer (carry) word is produced in a manner similar to that in the adder. The development of a coding with more than one parity bit is described in the mentioned publication [7] and in publication [6]. Also, any other desired codes having code bits added to the data word can be employed in a similar fashion. A compilation of various codes is described in the publication [5]. Developing the coding is a prerequisite for effectively using the monitoring arrangement described in the following.

With the help of circuit for duplicated carry generation 22, 23, a carry bit is produced once again as in the single elements 10a, 10b. To this end, of course, such a circuit for duplicated carry generation is required for each bit of the operands, only the circuit for duplicated carry generation 22, 23 for the i-th bit and for the (i+1)-th bit being shown for the sake of simplicity. The carry bit (transfer bit) of the next low-order single element of the ALU 10 inverted in each case by means of inverters is fed to each circuit for duplicated carry generation 22, 23. Thus, the carry bit $\ddot{U}_i$ of the single element 10a is fed via an inverter 24 as an inverted carry bit $\overline{\ddot{U}}_i$ of the circuit for duplicated carry generation 23 and, accordingly, the carry bit $\ddot{U}_{i+1}$ of the single element 10b of the ALU 10 is fed via an inverter 9 as an inverted carry bit $\overline{\ddot{U}}_{i+1}$ to the circuit for duplicated carry generation (not shown) for the (i+2)-th bit. Furthermore, the appropriate operand bits $A_i$, $B_i$ or $A_{i+1}$, $B_{i+1}$ are supplied as level converters via the connecting lines 13–16 and inverters 25–28 to the circuit for duplicated carry generation 22, 23. The switching performance of these inverters 25–28 corresponds to the y-curve in FIG. 5.

A more detailed representation of an exemplary circuit arrangement for such a circuit for duplicated carry generation 22, 23 is shown in FIG. 4. It is a question here, for example, of the circuit for duplicated carry generation 22. The operand bits $\overline{A}_i$ and $\overline{B}_i$ are tapped off from the connecting lines 13, 14 and fed via the inverters 25, 26 with the switching characteristic y in parallel to a NOR-gate 29 and a NAND-gate 30. The output signal from the NOR-gate 29 is gated with the carry bit $\ddot{U}_{i+1}$ in a combined gate 31 with an OR-operation, the output signal from the NAND-gate 30 with this gated signal being gated in turn with a NAND-operation. The output of the combined gate 31 then has the carry bit duplicated from the operand bits for monitoring. This type of circuit for duplicated carry generation is in greater detail, for example, in the publication "Efficient Implementations of Self-Checking Adders and ALUs" indicated at the outset.

Figure 3:
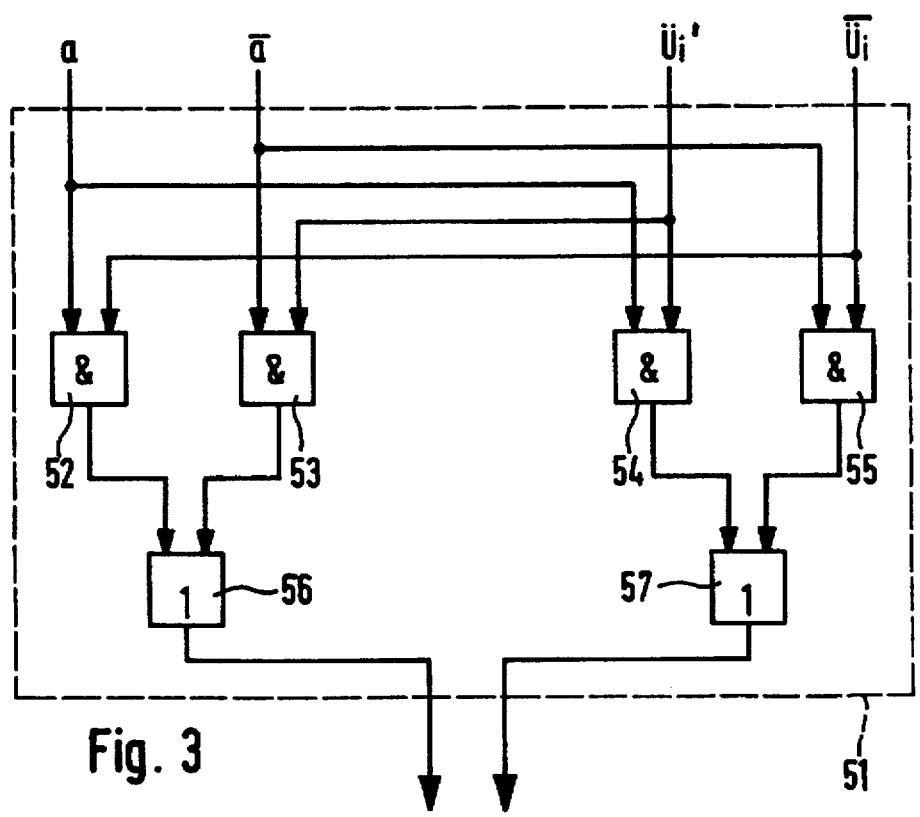
FIG. 3 shows an illustrative circuit diagram of an SCC stage as a testing device.

The carry bit produced at each output of a single element 10a, 10b of the ALU 10 must correspond, given correct functioning, to the carry bit produced in the corresponding circuit for duplicated carry generation 22, 23. To check this, the carry bit $\ddot{U}_i'$ produced, for example, at the output of the circuit for duplicated carry generation 22 and the carry bit produced at the output of the single element 10a and inverted by the inverter 24 are supplied as an inverted carry bit $\overline{\ddot{U}}_i$ i to a testing device 32. Given a correct functioning, the signals $\ddot{U}_i'$ and $\overline{\ddot{U}}_i$ must, therefore, be different; it must be a question, therefore, of an 0- and 1-signal or of a 1- and 0-signal. These inverse signal characteristics are checked in the testing device 32, which will be elucidated later on the basis of FIG. 3.

To further improve security with respect to bit corruptions of the operands, two code checkers 33, 34 are also provided, the code checker 33 being provided for checking the code of the operand $\overline{A}$, and the code checker 34 being provided for checking the correct code of the operand $\overline{B}$. To this end, all operand bits of the two operands $\overline{A}$ and $\overline{B}$ are supplied as level converters via inverters 35–38 to the code checkers 33, 34. The switching characteristic of these inverters 35 corresponds to the z-curve in FIG. 5. For the sake of simplicity, only the inverters 35–38 for the i-th and (i+1)-th bit of the two operands $\overline{A}$ and $\overline{B}$, respectively, are shown.

Figure 2:
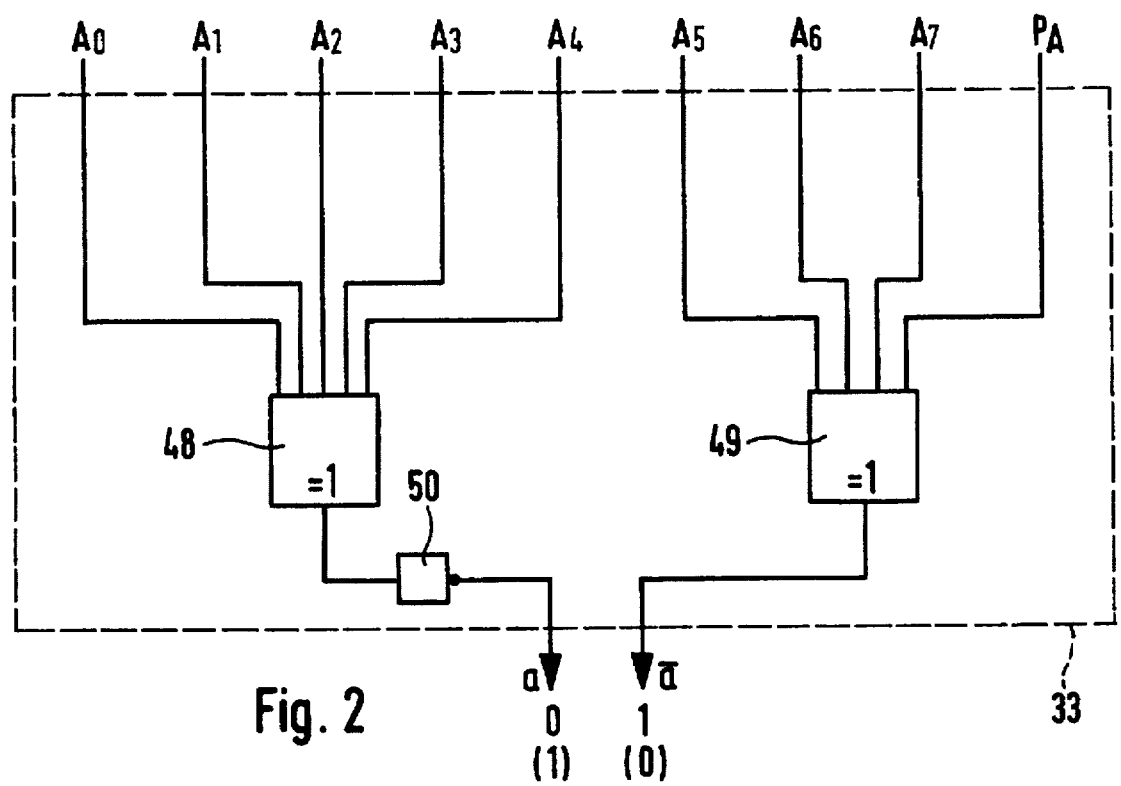
FIG. 2 shows an illustrative circuit diagram of a code checker.

The code checker 33 is shown in greater detail in FIG. 2 as an example. A comparable code checker is also described in the previously cited publication by John Wakerly, "Error Detecting Codes, Self-Checking Circuits and Applications". All of the operand bits $A_0$ through $A_7$ of the operand A developed in the example as an 8-bit operand, as well as the corresponding parity bit $P_A$ are supplied in two groups to two EXOR-gates 48 and 49. In so doing, the operand bits $A_0$ through $A_4$ are fed to the EXOR-gate 48, and the operand bits $A_5$ through $A_7$ to the EXOR-gate 49. The output of the EXOR-gate 48 is inverted by means of an inverter 50 and serves as a first output signal, while the output of the EXOR-gate 49 serves directly as a second output signal from the code checker 33.

This code checker 33 is used to test the code of an operand having a single parity bit, given even parity. From the operand bits and the parity bit, two groups can be arbitrarily formed, which are supplied to the two EXOR-gates 48, 49, the outputs of these two EXOR-gates 48, 49 then necessarily having to have the same output signal, when a correct coding exists. As a result of the inversion by means of the inverter 50, two inverse signals always exist, therefore, at the output of the code checker 33, given a correct coding. Given uneven parity, the inverter 50 is dropped, so that two inverse output signals are again at hand.

It must merely be checked at this point in the testing device 32, whether each of the applied signal pairs has inverse signals. It is a question here of the output signal pairs of the two code checkers 33, 34, as well as of the signal pairs of the duplicated carry bits of the single stages. So-called SCC-checkers (self-checking checkers) are suited for such testing of the presence of inverse signals, such a SCC-stage 51 being shown in greater detail in FIG. 3. A more detailed description of an SCC-stage 51 is also found in the publication already indicated by John Wakerly, "Error Detecting Codes, Self-Checking Circuits and Applications", pp. 66, 67. As an example, the two inverse output signals a and $\bar{a}$ of the code checker 33 and the two inverse carry bits $\ddot{U}_i'$ and $\ddot{\bar{U}}_i$ are fed to the SCC-stage 51 shown in FIG. 3. In so doing, the signals a and $\ddot{U}_i'$ are supplied to a first AND-gate 52, the signals $\bar{a}$ and $\ddot{U}_i'$ to a second AND-gate 53, the signals a and $\ddot{U}_i'$ to a third AND-gate 54, and the signals $\bar{a}$ and $\ddot{\bar{U}}_i$ to a fourth AND-gate 55. The outputs of the two AND-gates 52, 53 are gated with one another by way of an OR-gate 56, and the two outputs of the AND-gate 54, 55 are gated with one another by way of an OR-gate 57. The two outputs of the OR-gates 56, 57 make up the two outputs of the SCC-stage 51, where inverse signals must be applied, in turn, given correct input signals.

The testing device 32 is designed in dependence upon the number of signal pairs to be tested from a plurality of such SCC-stages 51. In each case, two signal pairs are converted in a SCC-stage 51 to form one signal pair, two output signal pairs from two SCC-stages being gated, in turn, by means of another SCC-stage, so that a tree-like arrangement of SCC-stages is at hand. Thus, an inverse signal pair exists, in turn, at the output of the testing device 32 when all operand bits and other bits are correct. If the same signals exist at these two output lines, then a warning device, in particular a warning light, or an appropriate screen display, when one is available, can point out an error of the system, or critical system functions can automatically be switched off when such an error exists.

The arrangement of the code checkers 33, 34, and the spaced apart configuration of the signal branches of the connecting lines 13–16 leading to the single elements 10a, 10b of the ALU 10 and the circuit for duplicated carry generation 22, 23, are decisive for detecting interrupt errors of an operand-bit line or connecting line 13–16. The just discussed signal branches leading to the single elements 10a, 10b and to the circuit for duplicated carry generation 22, 23 must be arranged between the data buses 11, 12 and the code checkers 33, 34. The sequence of the branchings leading to the single elements 10a, 10b and to the circuit for duplicated carry generation 22, 23 can also be reversed in this case; however, the branchings should have a minimum distance D interrupt faults. As a result of this distance, an interrupt acts either on the circuit for duplicated carry generation 22, 23 or on the single element 10a, 10b. If the interrupt has an effect on both units, then as a result of this arrangement, it also has an effect on the code checkers 33 or 34.

The inverters 17–20, 25–28, as well as 35–38 are used to detect short-circuit faults on the operand-bit lines, which can lead to altered (increased or reduced) signal levels. In this case, errors resulting from poor signal levels can also be detected, which are to be attributed to other causes. In the following, that voltage range below which the inverter reliably detects a logic "0" and above which it reliably detects a logic "1" at the number input is designated as the input-threshold voltage range of the inverters. These input-threshold voltage ranges of the three groups of inverters having the switching performance x, y and z are shown with shading in FIG. 5. They do not overlap one another and are arranged, so that for the conditions being considered in each case, the input-threshold voltage range of the inverters 35–38 lies between that of the inverters 17–20 having the switching performance x and of the inverters 25–28 having the switching performance y. It is, thus, ensured that when the same level is detected by the inverters 17–20 having the switching performance x and by the inverters 25–28 having the switching performance y, then inverters 35–38 having the switching performance z also detect the same level. If this level came about erroneously, then the code checker detects this error. If the inverters having the switching performance x and y detect different levels, then the error is determined by comparing the carry bit $\ddot{U}_i'$ and $\ddot{\bar{U}}_i$ or $\ddot{U}'_{i+1}$ and $\ddot{\bar{U}}_{i+1}$ in the testing device 32.

Thus the required properties of the inverters having the switching performance x, y and z can be achieved through proper dimensional design. Decisive for this in CMOS technology is the ratio of the geometric dimensions of the p-channel transistor to the n-channel transistor. For example, if one selects, for the inverters having the switching performance x, n-channel transistors that have a width twice the width of the corresponding p-channel transistors, given the same length, it is then useful, for example, for the inverters having the switching performance z to have n-channel transistors that are four times as wide as the corresponding p-channel transistors, and for the inverters having the switching performance y to have n-channel transistors that are eight times as wide as the corresponding p-channel transistors. The corresponding transfer characteristics or switching characteristics show clear differences in the input-threshold voltage range. By simulating all parameter fluctuations and ambient conditions, it is possible to check if the above requirement is being adhered to. Thus, all faults occurring with a certain probability can be detected with the described arrangement. An incorrect operand bit can be detected through code checking by means of the code checkers 33, 34. Accordingly, a bit error of the gated signal S could also still be checked. An incorrect carry bit is detected by duplicating the carries by means of the circuit for duplicated carry generation 22, 23. Interrupt errors of operand-bit lines are detected by the arrangement of the single elements 10a, 10b of the ALU 10 and of the circuit for duplicated carry generation 22, 23 relative to the arrangement of the code checkers 33, 34 in conjunction with a spaced-apart configuration of the signal branchings. Finally, indefinite signal levels, resulting for example from short-circuit faults on the operand-bit lines, can be detected by inverters 17–20, 25–28, as well as 35–38 employed as level converters.

As a generalization of the exemplary embodiment, in place of the inverted operands ($\overline{A}$, $\overline{B}$), one can also work with the non-inverted operands (A, B), when the corresponding logic operations are modified (sum and carry generation).

Furthermore, for the duplicate carry generation, in place of the bit stage $\ddot{U}_{i+1}$, $\ddot{U}_i$ preceding the duplicated carry, a duplicate carry $\ddot{U}_{i-2}$, $\ddot{U}_{i-3}$, together with operand bits $A_{i-1}$, $B_{i-1}$, $A_{i-2}$, $B_{i-2}$ ... can be used both in the blocks 10a, 10b as well as in the blocks 22, 23. Such "carry look-ahead" circuits are described in the technical literature, for example, in "Efficient Implementations of Self-Checking Adders and ALUs". One has to consider that, here as well, the corresponding level converters having characteristics x or y for the operand bits $A_{i-1}$, $B_{i-1}$, $A_{i-2}$, $B_{i-2}$ are used, and both a spaced-apart configuration and code-checking are carried out in accordance with FIG. 1.

What is claimed is:

1. An electronic arithmetic unit for gating a plurality of digital operands, the digital operands being provided by at least one data bus having a plurality of lines, each of the digital operands being coded by at least one code bit, comprising:

a plurality of first stages, each of the first stages gating a respective at least one bit of the operands and generating at least one carry bit and at least one bit of a result word;

at least one device for generating code bits for the result word;

at least one circuit for duplicated carry generation coupled to the at least one data bus, including a plurality of second stages, each of the second stages gating a respective at least one bit of the operands and generating at least one duplicated carry bit;

at least one testing device for checking the carry bits and duplicated carry bits for identity;

at least one code checker;

a plurality of first connecting lines linking the lines of the data bus to the code checker;

a plurality of second connecting lines linking the first stages to the first connecting lines; and a plurality of third connecting lines linking the second stages to the first connecting lines.

2. The arithmetic unit according to claim 1, wherein the first stages are spaced apart from the second stages, and further comprising a plurality of fourth connecting lines linking the first stages to the second stages.

3. The arithmetic unit according to claim 1, wherein outputs of the code checker are transmitted to the testing device.

4. The arithmetic unit according to claim 1, wherein the testing device includes a plurality of self-checking checker stages, and fault-free operation is indicated by generation of different output signals by the testing device.

5. The arithmetic unit according to claim 4, wherein the input and output signals are inverse signals.

6. The arithmetic unit according to claim 2, further comprising a plurality of first level converters connected to a respective one of the plurality of first connecting lines and to the code checker, a plurality of second level converters connected to a respective one of the plurality of second connecting lines and to a respective one of the plurality of first stages, and a plurality of third level converters connected to a respective one of the plurality of third connecting lines and to a respective one of the plurality of second stages, wherein the first, second and third level converters have gradationally different response and switching characteristics.

7. The arithmetic unit according to claim 6, wherein three input-threshold voltage ranges corresponding to the three groups of level converters do not overlap, the input-threshold voltage range of the first level converters lying between the input-threshold voltage ranges of the second level converters and the third level converters, the input-threshold voltage ranges being defined as voltage ranges below which a level converter detects a 0-signal and above which the level converter detects a 1-signal.

8. The arithmetic unit according to claim 6, wherein the level converters include inverters.

9. The arithmetic unit according to claim 7, further comprising gates linked to at least one of the first, second, third or fourth connecting lines, corresponding gates of the circuit for duplicated carry generation, and corresponding gates of the code checker, each gate having gradationally different response and switching characteristics.

10. The arithmetic unit according to claim 9, wherein the gates link inputs to the connecting lines.

11. The arithmetic unit according to claim 1, wherein the arithmetic unit is one of an ALU, a processor, and a controller.

* * * * *

UNITED STATES PATENT AND TRADEMARK OFFICE
CERTIFICATE OF CORRECTION

PATENT NO. : 5,629,945
DATED : May 13, 1997
INVENTOR(S) : Peter Sulzberger, Eberhard Boehl It is certified that error appears in the above-indentified patent and that said Letters Patent is hereby corrected as shown below:

Column 2, line 37, after "unit" insert --,--.

Column 2, line 45, before "input-threshold" insert --An--.

Column 4, line 45, before "to" delete "i".

Column 6, line 5, after "D" insert --from one another to be able to reliably detect such--.

Signed and Sealed this

Thirtieth Day of September, 1997

Attest:

BRUCE LEHMAN

*Attesting Officer*    *Commissioner of Patents and Trademarks*